US008880616B2

(12) United States Patent
Schuelke et al.

(10) Patent No.: US 8,880,616 B2
(45) Date of Patent: Nov. 4, 2014

(54) METHOD AND SYSTEM FOR DISTRIBUTING CONTENTS TO A PLURALITY OF USERS

(75) Inventors: Anett Schuelke, Heidelberg (DE); Ernoe Kovacs, Heidelberg (DE)

(73) Assignee: Nec Corporation, Tokyo (JP)

( * ) Notice: Subject to any disclaimer, the term of this patent is extended or adjusted under 35 U.S.C. 154(b) by 2008 days.

(21) Appl. No.: 11/701,365

(22) Filed: Feb. 2, 2007

(65) Prior Publication Data

US 2007/0183354 A1   Aug. 9, 2007

(30) Foreign Application Priority Data

Feb. 3, 2006   (DE) .................... 10 2006 005 479

(51) Int. Cl.
*G06F 15/16*   (2006.01)
*H04L 29/08*   (2006.01)
*H04L 12/58*   (2006.01)
*H04L 12/18*   (2006.01)

(52) U.S. Cl.
CPC .............. *H04L 67/104* (2013.01); *H04L 67/26* (2013.01); *H04L 12/58* (2013.01); *H04L 12/1859* (2013.01); *H04L 67/306* (2013.01); *H04L 67/24* (2013.01); *H04L 67/1095* (2013.01); *H04L 67/1044* (2013.01)
USPC ........... 709/206; 709/203; 709/204; 709/205; 725/35

(58) Field of Classification Search
USPC ......................................................... 709/206
See application file for complete search history.

(56) References Cited

U.S. PATENT DOCUMENTS

| 6,453,339 | B1 * | 9/2002 | Schultz et al. ............... 709/206 |
|---|---|---|---|
| 7,254,608 | B2 * | 8/2007 | Yeager et al. ................. 709/203 |
| 7,257,628 | B2 * | 8/2007 | Liskov et al. ................. 709/223 |
| 7,849,140 | B2 * | 12/2010 | Abdel-Aziz et al. .......... 709/206 |
| 2003/0126600 | A1 * | 7/2003 | Heuvelman ...................... 725/35 |
| 2004/0148344 | A1 * | 7/2004 | Navar et al. ................... 709/203 |
| 2004/0203751 | A1 * | 10/2004 | Banaei ........................ 455/432.1 |
| 2005/0172001 | A1 * | 8/2005 | Zaner et al. ................... 709/205 |
| 2005/0193054 | A1 * | 9/2005 | Wilson et al. ................. 709/200 |
| 2005/0198125 | A1 * | 9/2005 | Beck et al. .................... 709/204 |
| 2005/0273833 | A1 * | 12/2005 | Soinio ........................... 725/113 |
| 2006/0072721 | A1 * | 4/2006 | Wisniewski ............... 379/88.22 |
| 2007/0183354 | A1 | 8/2007 | Schuelke et al. |

FOREIGN PATENT DOCUMENTS

WO   01/77876   10/2001

* cited by examiner

*Primary Examiner* — Phuoc Nguyen
*Assistant Examiner* — Kishin G Belani
(74) *Attorney, Agent, or Firm* — Young & Thompson (57) ABSTRACT

A method for distributing contents to several users, wherein users are interconnected as members of one or more groups and wherein the group members can be pre-arranged from the user side is characterized in that based on his context a user can select one or more content from offered contents, in that the selected contents are dynamically personalized by taking advantage of a correlation of selected contents on the one hand and a group on the other hand by embedding communication triggers into the contents to initiate a communication with a group, and in that the personalized group-related contents are pushed to the members of the group.

58 Claims, 6 Drawing Sheets

METHOD AND SYSTEM FOR DISTRIBUTING CONTENTS TO A PLURALITY OF USERS

BACKGROUND OF THE INVENTION

1. Field of the Invention

The present invention concerns a method for distributing contents to several users, wherein users are interconnected as members of one or several groups and wherein the group members can be pre-arranged by the user.

2. Description of the Related Art

In today's service world, communication services on one hand and services for communicating contents on the other are clearly separated from each other. Contents are linked to the Internet or the mobile web browsing world and are provided to a user on demand or on a subscribed mode by a server system. Here, for example, websites, CMS (Content Management Systems) or weblogs are to be mentioned. Weblog systems (abbreviated: blogs) are systems to publish personal contents and are based on the homepage concept with the advantage of a very simplified administrative and communicative support. These online journals are mainly used due to private interests, for example, as personal diary, but have in addition certainly also a potential for business use, for example, as company-internal blackboard. Within a blog the contents are ordered chronologically, regularly updated and permanently linked, so they provide interactive functions to the recipient of the contents.

Based on the SIP (Session Initiation Protocol) standard, the 3GPP standardization consortium has recently developed a platform for packet-based communication. This so-called IMS (IP Multimedia Subsystem) standard provides a comprehensive architecture for new communication services. Hence, in co-operation with 3GPP and IETF, the OMA (Open Mobile Alliance) consortium has already developed service specifications for Presence technology, group management (XDMS) or for Push-to-talk over Cellular (PoC). PoC is a service permitting the user to send voice messages to one or more recipients via their mobile phone. The service works according to the walkie-talkie concept, whereas the members of a group first get a signaling via the SIP protocol. Consequently, the voice message is sent via the RTP (Real Time Protocol) in the context of a packet-switching mobile radio connection (GPRS) to the group members. The user can arrange the group members in a push-to-talk menu via the corresponding mobile numbers.

Currently, the OMA strives to develop standard specifications for services for dynamically providing contents (Dynamic Content Delivery, DCD). In several countries, particularly in Asia, there are already products available that push contents dynamically. Just to give an example, the i-Channel of NTT DoCoMo should be referred to. With this kind of services, the user subscribes to a content channel and receives all content updates on his mobile terminal. The concept is comparable to the RSS feed as known from the Internet.

SUMMARY OF THE INVENTION

Hence, the present invention is based on the task to design and further develop a method for distributing contents to several users in such a way that the exchange of information between users and discussions about contents within their existing social networks is possible with easy means.

According to the invention, the task mentioned above is solved by a method showing the characteristics of patent claim 1. According to this, the method is characterized and further developed in such a way that based on his context a user can choose one or more contents items among offered contents, that the selected contents items are dynamically personalized by exploiting the correlation between the selected contents items on one hand and a group by embedding communication triggers for initiating a communication with a group into the contents on the other hand, and that the personalized, group-related contents are pushed to the group members.

According to the invention, it has been recognized that the separation of content services on the one hand and communication services on the other hand as common up to now does not meet the need of users to share contents within their social networks and to exchange knowledge and discuss. Hence, according to the invention, contents which the user can select from offered contents based on his context are adjusted dynamically. Here, a correlation between the selected contents on one hand and a group on-the other hand is exploited, and communication triggers to initiate a communication with the group are embedded in the content. The contents adjusted in such a way are pushed to the group members.

The communication triggers represent a communication session that can be established by the user. They contain parameters for the communication session, as for example, the addresses of communication partners, parameters for displaying (for example, as icons or text) and similar information. The communication triggers allow for providing the user a "sharing" function for every content item, wherein the sharing function enables the initiation of a communication session with the correlated group. The sharing function can, for example, be realized as a button on a display, as an action message for a soft key or a specific hard key. The user can then establish a communication session either with the pre-defined group. (as correlating with the content) or with any other recipients (for example from his address book).

The advantage of the method according to the invention is the combination of a content download service running non-intrusively in the background with communication means. In this way, users are motivated to use communication services. Moreover, the method according to the invention provides a support for using communities or social network services (SNS) to discuss or exchange contents.

In a particularly advantageous way and in the case of dynamic personalization, a communication channel is set through which the group members can be reached. Information about this communication channel can also be embedded in the content. The kind of the communication channels is basically not limited; They can be, for example, communication channels in form of chat rooms, PoC etc.

Respecting a specifically high dynamic, the availability (Presence), location, group membership and/or similar information can be considered as context of a user. The context "location" permits, that, e.g., a user is only sent information about, for example, shopping and/or recreational opportunities, in a specific town if the user actually is in this town.

A user can basically belong to an arbitrary number n of different groups. In practice, groups usually form due to shared interests, hobbies, professions or the like. Private groups can be envisioned whose members are all members of a specific sports club. Moreover, there are general interest groups which users join when being interested in, for example, sports news or cultural information. The groups can, for example, be formed statically. It is also possible to generate groups based on dynamic parameters, for example, based on user preferences and context parameters as, for example, "shopping in the new town". Closed user groups as well as open user groups can be envisioned.

In the context of a concrete embodiment it is provided that a pull agent is used for selection of contents by the user gathering information from different content channels. The selection of content channels offered by a network provider or service provider is subject to the agreements of the service provider with his content partners. In case of content channels with which the pull agent communicates, they could be, for example, RSS agents and/or mail agents.

In an advantageous way, each content channel is associated with a channel profile which preferably contains information about the channel ID, the pull period, the title, the location, the expiration time and/or the like.

In the context of a particularly preferable embodiment, all the contents provided by one of the content channels, are represented by a content item. The content item can, for example, contain an unambiguous ID, a channel ID, a title, the content, a time stamp and/or an expiration time. The parameter "title" represents a summary of the content. Adding an expiration time can make sense for contents related to a specific event taking place at a specific point in time. For example, it does not make any sense to offer tickets for a concert that has already taken place.

Related items will not be valid any more. The kind of content items is not restricted, concretely they can be, for example, text, pictures, videos etc or combinations of such.

In order to prepare the push process it can be provided that the content items of the selected contents are analyzed by a distribution logic.

Considering the group-content-correlation, the content items can be extended by personalized communication means (chat, video-conference etc), wherein the user preferences and the group association can be respected. The content items can be sorted into waiting queues for distribution.

Regarding the push technology used by a push agent to distribute the contents, it can be provided that SMS, e-mail, TM, TCP, HTTP or similar technologies are used. As a matter of principle, using technologies realizing a 1-1 push, for example SMS, but also using technologies based on a group server push concept (for example in form of media-enhanced chat rooms or broadcast technologies) can be envisioned.

In order to respect the fact that today the distribution of contents is subject to a multitude of different protection rules, access rights of the group members to pushed contents can be controlled in an advantageous way by a DRM (Digital Rights Management) system. The access rights can be respected when generating the group-content correlation. In the context of a concrete embodiment it can be provided that the distribution of the pushed contents is restricted to the group members. In this mode, the communication settings assigned to the content can not be augmented, so the content cannot be shared with entities outside the group.

In the context of another implementation it can be provided that the distribution of the pushed contents is restricted in such a way that the group members can forward the contents to a further user or a further group, respectively. In this mode the communication settings assigned to the content can only be extended within certain limits.

Depending on the group settings (for example restricted or open group) extensions to members of a group call can be admitted. In any case, only group members may permit forwarding contents to entities outside the group. In addition, the permission refers only to one layer, i.e. from parent layer to child layer. On the child layer, there is only the option to view the contents, but the permission to share a group communication is not provided.

Finally, a mode can be envisioned where the distribution of pushed contents is unrestricted. As far as the distribution of contents is permitted, distribution is open to all networks, protocols and technologies. For example, it is possible to receive a program regarding sport events over a mobile network and to distribute it to group members by using a local file server which is installed in a WLAN, or to share ("sharing") photos received over a group-based content push with a friend by using P2P connection.

Now, there are several options of how to design and to further develop the teaching of the present invention in an advantageous way. For this purpose, it must be referred to the claims subordinate to claim 1 on the one hand and to the following explanation of preferred examples of an embodiment of the invention together with the figure on the other hand. In connection with the explanation of the preferred examples of an embodiment and the figure, generally preferred designs and further developments of the teaching will also be explained.

DESCRIPTION OF THE PREFERRED EMBODIMENTS

Figure 1:
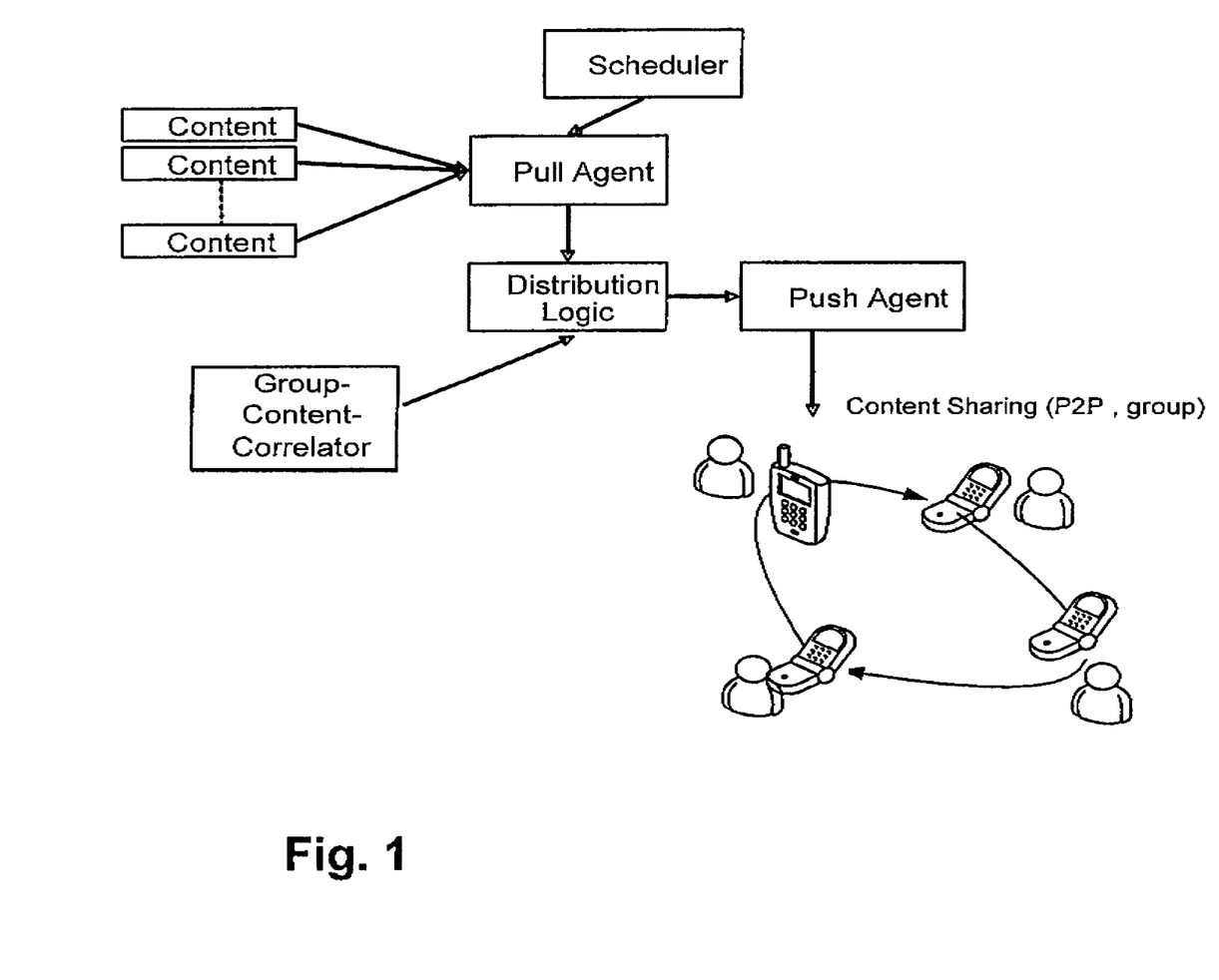
FIG. 1 is a schematic illustration of an example of an embodiment of a system for group-moderated distribution of contents in order to perform the method according to the invention.

FIG. 1 shows a scheme of a delivery system to perform the method according to the invention. The system can basically be divided into a channel management system and a delivery system. The central component of the channel management system is a pull agent gathering information from different content channels. The gathered contents enter a distribution logic and are connected to profiles of groups and users. In other words, a group-content correlation is created and on this basis a push agent distributes contents to corresponding groups. It can be provided that the push agent delivers the contents to all members of the group. Alternatively, a further distribution within the group is possible in the P2P (peer-to-peer) mode.

Figure 2:
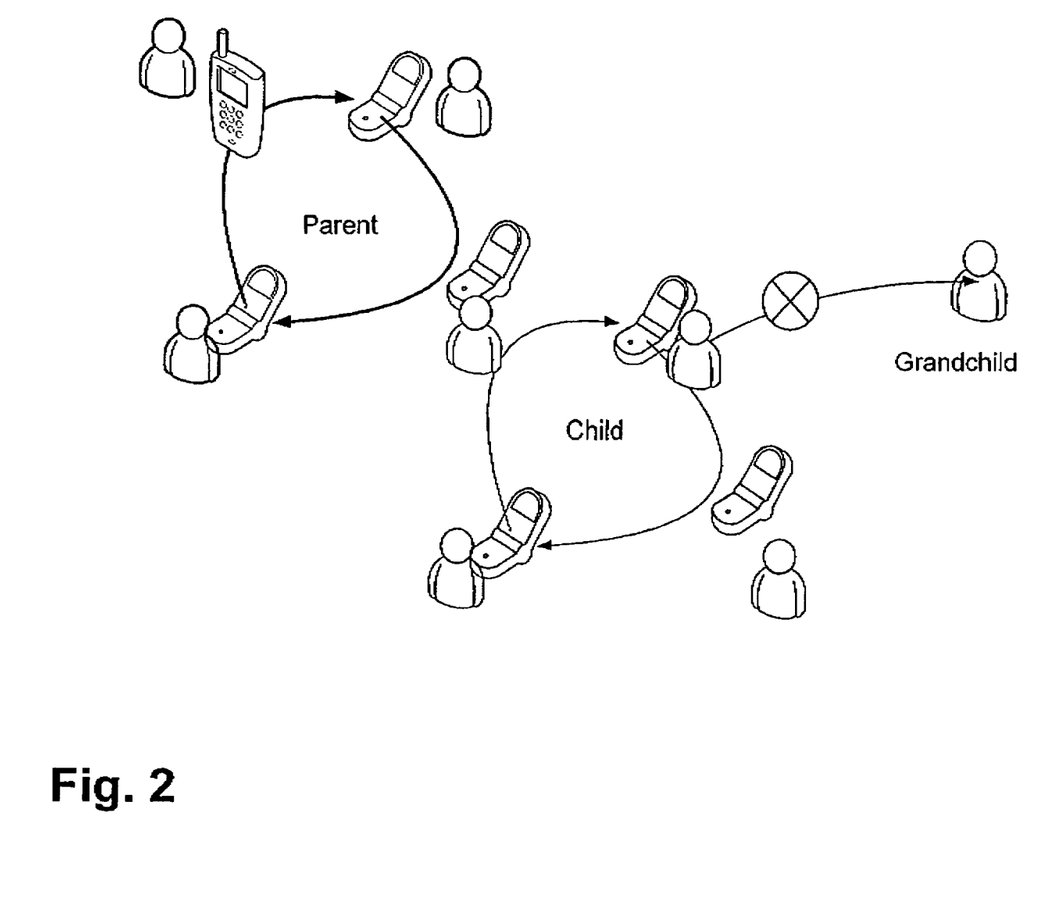
FIG. 2 is a schematic illustration of a distribution of contents within groups considering access rights.

FIG. 2 shows in a scheme the permission rules for the group-content correlation that can be controlled by a DRM system. All in all, three different distribution modes can be envisioned. First of all, there is a mode in which the distribution of contents is restricted to a group. This means the distribution of contents is limited to the boundaries of the group-content correlation. As mentioned above, contents can either be distributed to all members of a group and no rights for further distribution to members outside the group are attributed.

Alternatively, the content is first delivered to a first (prime) member who then forwards the contents to all members of the respective group. This kind of distribution is particularly beneficial for hierarchical groups. In FIG. 2, this mode corresponds to an exclusive distribution of contents within the group labelled "parents". Such a group limitation can, for example, be realized by assigning fixed communication settings to the group, for example as PoC group URI or a conference server phone number.

Alternatively, a mode can be envisioned that has the option to forward a content only once to a user outside the group, wherein this option is limited to the members of the group. Hence, this represents a kind of parent-child relationship, where a member of a "parent" group can distribute the content beyond group boundaries to a member of a "child" group. This "child" is not necessarily a single user, but it can also be a group to which the forwarding user also belongs to. In this mode, the child does not inherit any distribution rights, i.e. the child itself does not have the permission to forward the contents. Moreover, the "child" has only limited rights to initiate a communication. By assigning only reading rights to the "child" level, restricted groups, for example, pre-defined closed groups or context-triggered temporarily closed groups can stop "children" from initiating a communication session or from joining an already established communication session.

With regard to the distribution of contents, finally, an unrestricted mode is possible, where free distribution rights beyond the boundaries of original groups is possible. This means that the "children" inherit the option of further distribution and can forward contents received from a "parent" group to "grandchildren" members. An extension to further hierarchical levels, i.e. forwarding to a "grand-grand-children" level, can also be envisioned.

Figure 3:
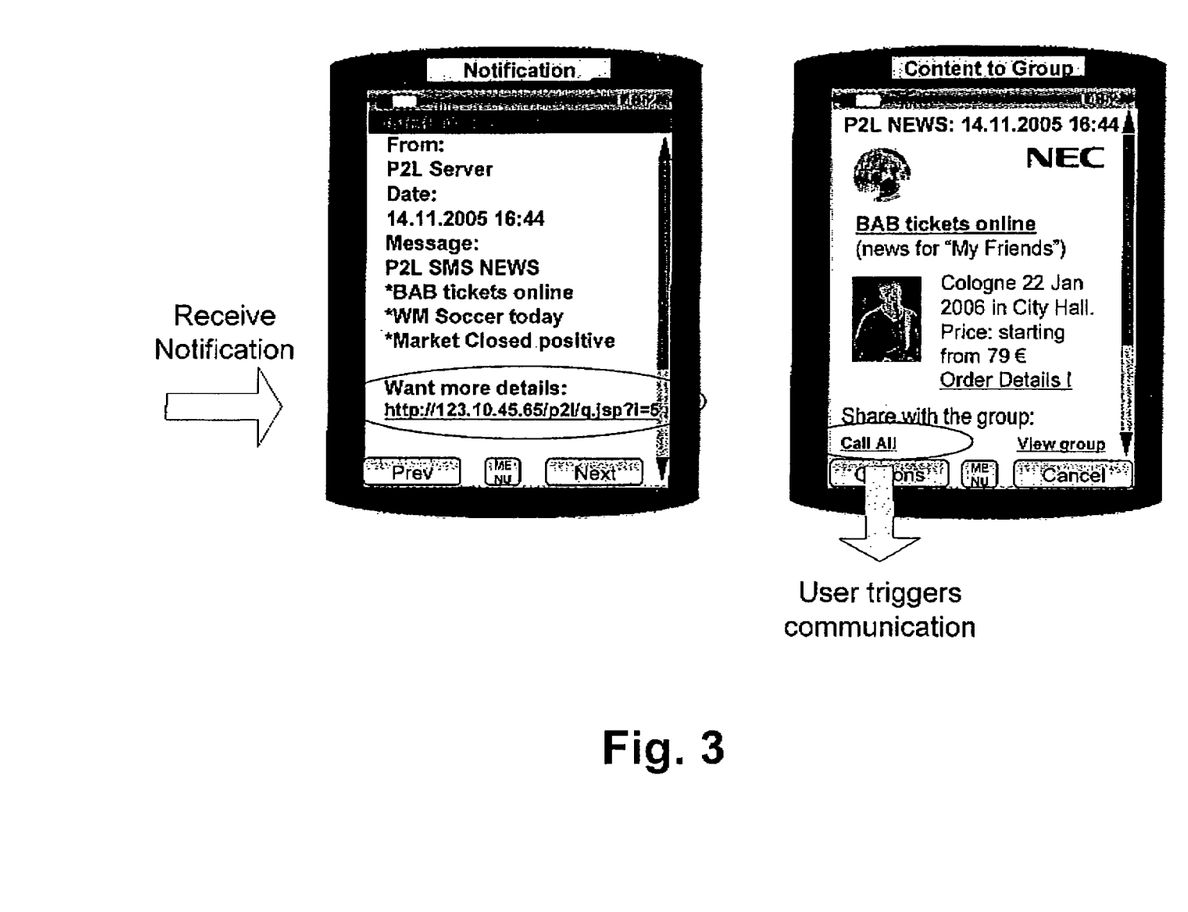
FIG. 3 is a schematic illustration of an example of an embodiment of the method according to the invention from a user's perspective.

FIG. 3 depicts the method according to the invention as it is experienced from a user's point of view. The display of a terminal of a user, for example, a mobile phone, is shown at different points in time.

On the left side of the figure a situation is shown where a user has received a message as an SMS from a server. The message contains all in all three contents, wherein first of all only short summaries of the contents are sent due to the fact that SMS technology, which is restricted with regard to the sent message size, is used. This push is realized as "zero" click for the user, i.e. it happens automatically. By clicking on contents that are of interest for the user, he can display a more detailed description of the corresponding contents. This is depicted in the right part for the content "BAB tickets online".

As it can be derived from the shown screens, according to the invention, on the basis of a correlation between the content on the one side and the group on the other side, the content was personalized. Concretely, here it is the group of "my friends". This means that the push of the content to the device of the user happened in a personalized way, whereby the personalization was already performed before pushing from the server and hence the user cannot experience this itself. The user can now send a message to the group of "my friends" by clicking the respective button and hence use the content to initiate a group communication. The user can choose whether he wants to communicate with all the members of the group or only with specific members of the group.

The kind of communication is already embedded into the content to be distributed to the group members from the server side, wherein the function of initiating communication, i.e. clicking the respective buttons as depicted in the right part of FIG. 3, is connected to the server of the content-push-service provider. In order to do so, the server creates a logic link between the group, the kind of communication and the corresponding communication status. By doing so, an efficient usage of communication resources is enabled. A subsequent trial of initiating a missed communication session can be handled in such a way that the corresponding person joins an ongoing communication or receives a notification about an already ongoing communication.

Figure 4:
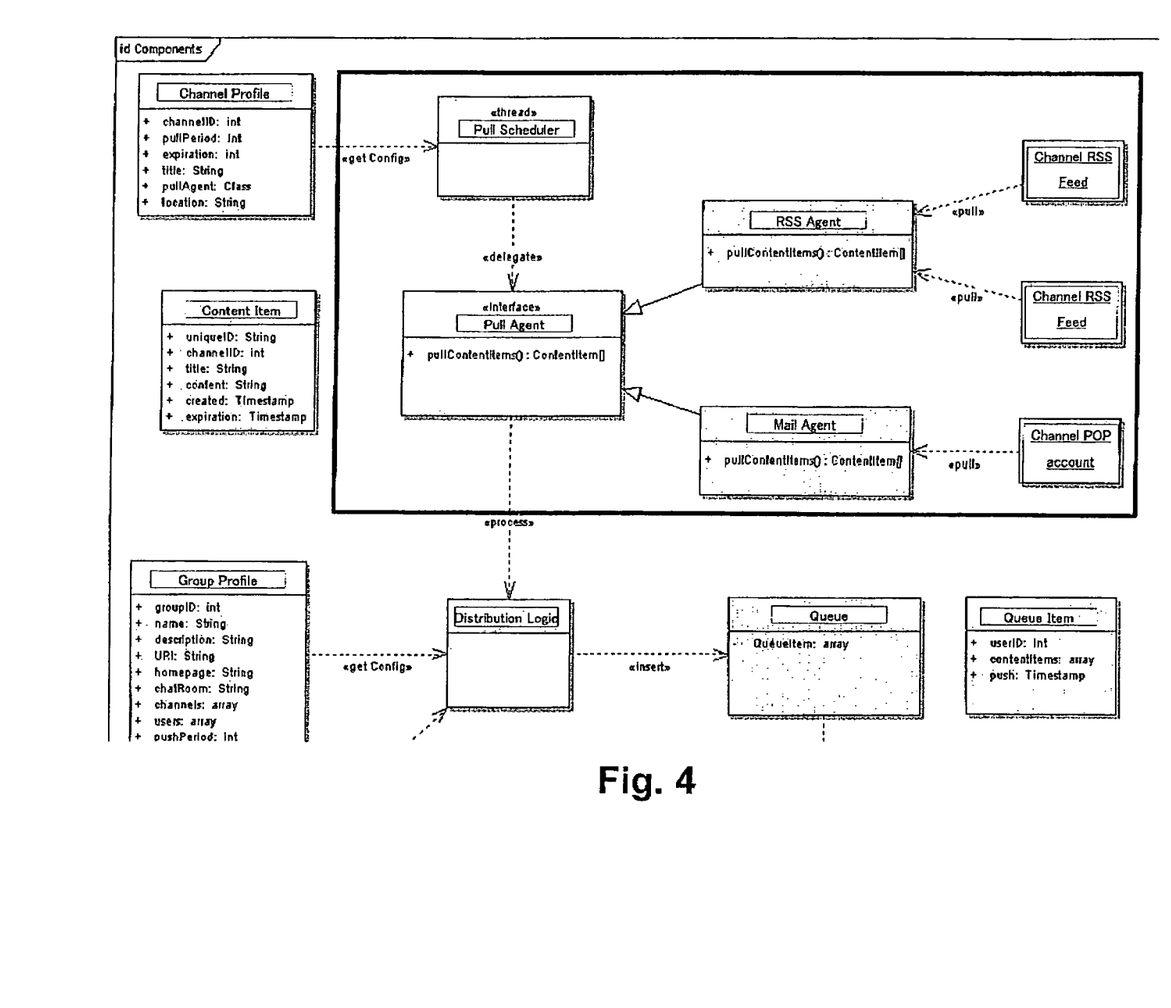
FIG. 4 is a schematic illustration of the components of a channel management system of an example of an embodiment of a system to perform the method according to the invention.
Figure 5:
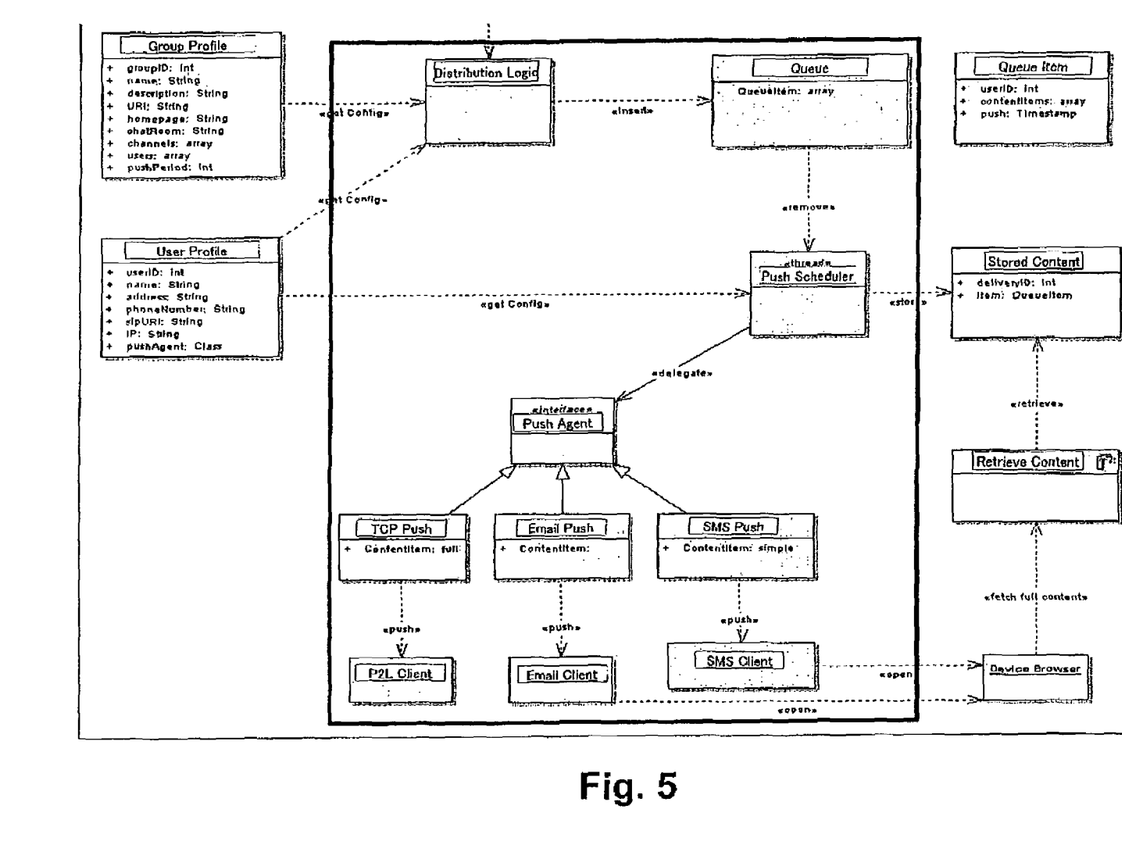
FIG. 5 is a schematic illustration of the distribution mechanism of the example of an embodiment shown in FIG. 4.

FIGS. 4 and 5 show schematically in a UML (Unified Modeling Language) diagram the essential components and their functionalities of an example of an embodiment of a system to perform the method according to the invention. FIG. 4 basically shows the channel management system, whereas FIG. 5 adjacent to the lower part of FIG. 4 shows the delivery system. The group profile, the distribution logic and the queue item are depicted in both figures in order to clarify the connection of both drawings.

Referring to FIG. 4, first of all the channel management system will be described in the following. The essential component of the channel management system is a pull agent gathering information from different content channels. In the example of an embodiment according to FIG. 4, an RSS agent and a mail agent are provided for as sources of information. Based on information regarding the channel profiles provided to the pull agent by a pull scheduler, the pull agent performs the pull process for a specific channel. A channel profile contains information such as the pull period, the location and the expiration time in order to specify the timing and the frequency of the pull process. The RSS agent forms an instance of the pull agent and is responsible for receiving contents from different channels over RSS feed. The mail agent uses the mail protocol and works similarly for the rest.

The contents coming together at the pull agent contain each specific parameters, for example, an ID labelling the content itself, a channel ID, title, content, time stamp and an expiration time, all comprised in a content item. The parameter of "title" is a short abstract of the contents that can also be called tickers and that are pushed to the subscribers of the corresponding channel. In contrast, the parameter of "content" is a detailed description of the short abstract arid can in particular also contain pictures, links, requests for communication etc.

Based on the pull process, the pull agent invokes corresponding processes at the distribution logic. The distribution logic is the entrance point to the distribution system (delivery system) and is depicted in FIG. 4, as well as in FIG. 5. The logic analyzes the information stored in the content items of the contents and creates a correlation of the group profiles and the user profiles.

The group profiles are stored in a database and contain, as a minimum of information, information regarding a group ID and the push period. Further possible parameters are a group name, a description (for example regarding the size and/or the interests), a homepage (for example, blog, photo pages), a group URI (for example, for a SIP-based communication) etc. After creation of the described correlation the distribution logic gathers the contents in a waiting queue. Based on the delivery configuration, the push process triggers the push agents to distribute the contents. The user preferences or the capabilities of the user-sided devices are used to define that kind of push technology that is suitable to distribute the corresponding contents. The contents offered to the users are consequently highly personalized, i.e. regarding the exchange of information and communication they are adjusted to the specific needs of a user and his group/groups.

The push agents can be realized in different technologies, wherein in the example of an embodiment shown in FIG. 5, SMS, e-mail and TCP are concretely provided for as push technology. In case of SMS and e-mail the delivery mechanism is based on simple SMS and e-mail clients to display the content of the pushed information. In case of TCP, a TCP connection to a specific client is provided as host of the corresponding terminal.

Figure 6:
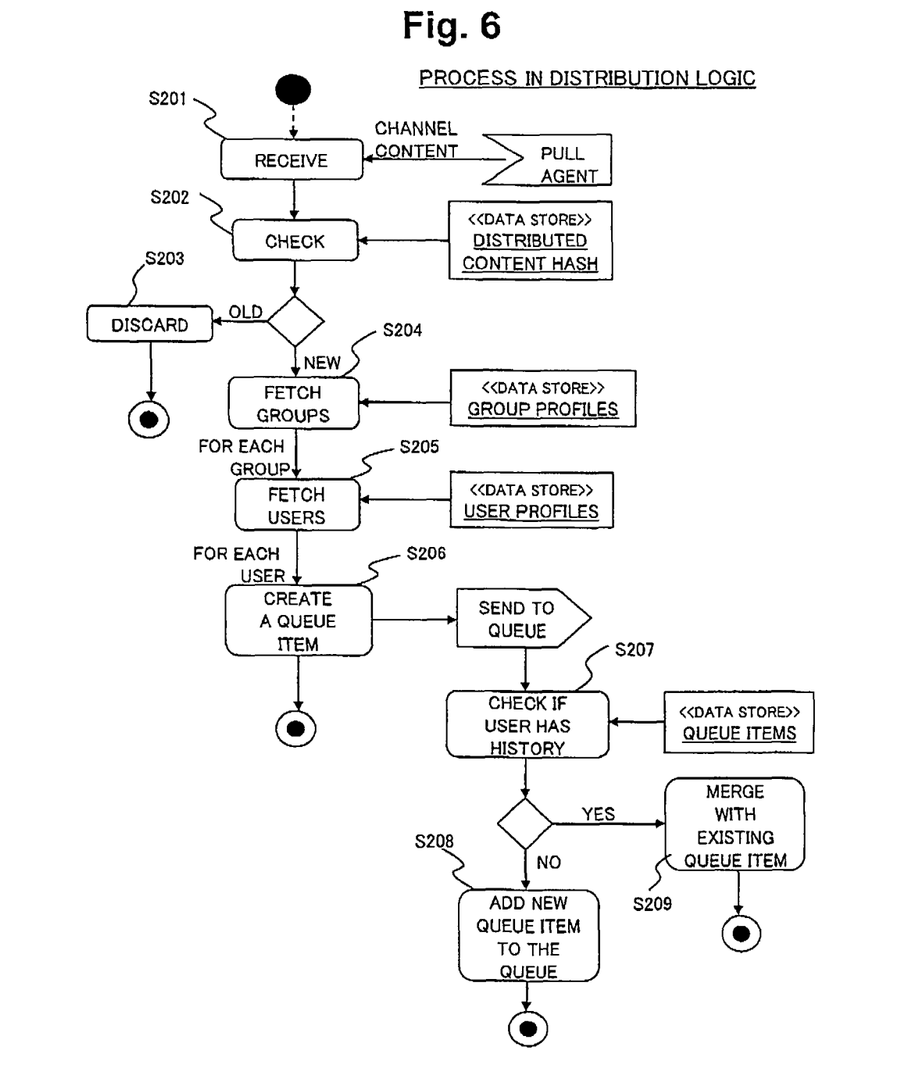
FIG. 6 is a flow chart of a distribution logic of the examples of an embodiment shown in FIG. 4 and 5, based on profiles of groups and users.

FIG. 6 shows in form of a flow chart the processes run at the distribution logic of the example of an embodiment shown in FIGS. 4 and 5. In a first step S201 the distribution logic receives the contents from the pull agent. The information contained in the content items is analyzed and it is first checked whether the contents are old or new ones (step S202). Old contents can, for example, occur if it was requested twice from the server due to system race conditions. Old contents are discarded (step S203.)

In a next step S204 the information regarding the group profiles is tied in and it is e.g. considered which content channels a group has subscribed. For each group, the user profiles of the respective group members are tied in (step S205) Based on this information, awaiting queue, in which the contents are stored in personalized form, is created for each user (step S206).

In a next step S207 it is checked whether the user has a history. For example, a user can define that he wants to receive new information every two hours. If the content is the first content after a push a new waiting queue is created (step S208), otherwise the content is added to the existing waiting queue (step S209).

Regarding further preferable embodiments of the method according to the invention and to avoid repetitions, it is referred to the general part of the description as well as to the attached claims.

Finally, it is particularly important Lo point out that the examples of an embodiment of the teaching according to the invention from above only serve as illustration of the teaching as according to the invention, but that they do by no means restrict the latter to the given examples of an embodiment.

The invention claimed is:

1. A method for distributing contents to several users, comprising:
   interconnecting users as members of one or more social groups with the social group members pre-arranged from the user side by the user, comprising
   a) based on a user's context and using a pull agent in one of i) a user-side device and ii) a network-side component, obtaining contents items from contents offered from different content channels, by executing a channel management operation comprising the sub-steps of:
   using the pull agent to gather information regarding channel profiles from the different content channels, the different content channels serving as different sources of information, the channel profiles containing information of the content of the respective content channels, and
   based on the gathered information regarding the profiles provided to the pull agent, using the pull agent to perform a pull process from each of the different content channels to obtain the contents items;
   b) based on the pull process from each of the different content channels, executing a distribution logic to create personalized group-related contents, the group-related contents being personalized to each of the members of each social group, by the sub-steps of:
   a selecting sub-steps of i) analyzing information stored in the obtained contents items and ii) creating a correlation of content and group profiles, the group profiles stored in a database and contain information regarding a group ID, a social group profile with social group properties, and a push period,
   based on the created correlation, gathering selected contents items from the obtained contents items,
   embedding communication IQ triggers into the gather contents items to initiate a communication with the members of the group to define a delivery configuration; and
   c) based on the delivery configuration, using a push agent to push the personalized group-related contents to the pre-arranged members of the social group with the content being distributed to multiple users and personalized for each of the multiple users,
   wherein in the framework of the generation of the group-content-correlation a communication channel, over which the group members can be reached, is set, and
   wherein the distribution logic includes the user selecting a distribution mode from plural available distribution modes, the selected distribution mode determining
   i) which members of the pre-arranged members of the social member to which the personalized group-related contents will be pushed by the push agent, and
   ii) for the members receiving the personalized group-related contents pushed by the push agent, further distribution rights of the personalized group-related contents.

2. The method according to claim 1, wherein groups are statically pre-arranged.

3. The method according to claim 1, wherein the content channels are not any of the social group members.

4. The method according to claim 1, wherein the content channels are different RSS agents.

5. The method according to claim 1, wherein the groups are generated based on dynamic parameters.

6. The method according to claim 1, wherein the distribution logic includes the user selecting a distribution mode from plural available distribution modes, the selected distribution mode determining a sub-set of the pre-arranged members of the social members to which the personalized group-related contents will be pushed by the push agent.

7. The method according to claim 1, wherein the groups are one of closed user groups and open user groups.

8. The method according to claim 2, wherein the groups are one of closed user groups and open user groups.

9. The method according to claim 3, wherein the groups are one of closed user groups and open user groups.

10. The method according to claim 4, wherein the groups are one of closed user groups and open user groups.

11. The method according to claim 5, wherein the groups are one of closed user groups and open user groups.

12. The method according to claim 6, wherein the groups are one of closed user groups and open user groups.

13. The method according to claim 1, wherein a pull agent gathering information from different content channels is used to select contents by the user side.

14. The method according to claim 1, wherein the content channels with which the pull agent communicates are at least one of RSS agents and mail agents.

15. The method according to claim 13, wherein the content channels with which the pull agent communicates are at least one of RSS agents and mail agents.

16. The method according to claim 1, wherein the content channels with which the pull agent communicates are at least one of RSS agents and mail agents.

17. The method according to claim 1, wherein the content channels are each assigned a channel profile, comprehensive information regarding the channel ID, the pull period, the title, the location, and the expiration time.

18. The method according to claim 14, wherein the content channels are each assigned a channel profile, comprehensive information regarding the channel ID, the pull period, the title, the location, and the expiration time.

19. The method according to claim 1, wherein the contents provided by the content channels are represented by individual content items.

20. The method according to claim 17 wherein the contents provided by the content channels are represented by individual content items.

21. The method according to claim 19, wherein the content items contain an unambiguous ID, a channel Id, a title, the content, a time stamp, and an expiration time.

22. The method according to claim 20, wherein the content items contain an unambiguous ID, a channel Id, a title, the content, a time stamp, and an expiration time.

23. The method according to claim 19, wherein a distribution logic analyzes the content items of the selected contents.

24. The method according to claim 20, wherein a distribution logic analyzes the content items of the selected contents.

25. The method according to claim 1, wherein the selected contents are pushed by using at least one of SMS, e-mail, IM, SIP, TCP, and HTTP.

26. The method according to claim 1, wherein access rights of the group members to the pushed contents are controlled by a DRM (Digital Rights Management) system.

27. The method according to claim 1, wherein the distribution of the pushed contents is restricted to the group members.

28. The method according to claim 2, wherein the distribution of the pushed contents is restricted to the group members.

29. The method according to claim 3, wherein the distribution of the pushed contents is restricted to the group members.

30. The method according to claim 5, wherein the distribution of the pushed-contents is restricted to the group members.

31. The method according to claim 7, wherein the distribution of the pushed contents is restricted to the group members.

32. The method according to claim 1, wherein the distribution of the pushed contents is restricted to the group members.

33. The method according to claim 1, wherein the distribution of the pushed contents is restricted in such a way that the group members can forward the contents to one further user or to one further group respectively.

34. The method according to claim 2, wherein the distribution of the pushed contents is restricted in such a way that the group members can forward the contents to one further user or to one further group respectively.

35. The method according to claim 3, wherein the distribution of the pushed contents is restricted in such a way that the group members can forward the contents to one further user or to one further group respectively.

36. The method according to claim 5, wherein the distribution of the pushed contents is restricted in such a way that the group members can forward the contents to one further user or to one further group respectively.

37. The method according to claim 7, wherein the distribution of the pushed contents is restricted in such a way that the group members can forward the contents to one further user or to one further group respectively.

38. The method according to claim 1, wherein the distribution of the pushed contents is restricted in such a way that the group members can forward the contents to one further user or to one further group respectively.

39. The method according to claim 1, wherein the distribution of the pushed contents is unrestricted.

40. A method for distributing contents to several users, comprising:
   interconnecting users as members of one or more social groups with the social group members pre-arranged from the user side by the user, comprising
   a) based on a user's context and using a pull agent in one of i) a user-side device and ii) a network-side component, obtaining contents items from contents offered from different content channels, by executing a channel management operation comprising the sub-steps of:
   using the pull agent to gather information regarding channel profiles from the different content channels, the different content channels serving as different sources of information, the channel profiles containing information of the content of the respective content channels, and
   based on the gathered information regarding the profiles provided to the pull agent, using the pull agent to perform a pull process from each of the different content channels to obtain the contents items;
   b) based on the pull process from each of the different content channels, executing a distribution logic to create personalized group-related contents, the group-related contents being personalized to each of the members of each social group, by the sub-steps of:
   a selecting sub-steps of i) analyzing information stored in the obtained contents items and ii) creating a correlation of content and group profiles, the group profiles stored in a database and contain information regarding a group ID, a social group profile with social group properties, and a push period,
   based on the created correlation, gathering selected contents items from the obtained contents items,
   embedding communication IQ triggers into the gathered contents items to initiate a communication with the members of the group to define a delivery configuration; and
   c) based on the delivery configuration, using a push agent to push the personalized group-related contents to the pre-arranged members of the social group with the content being distributed to multiple users and personalized for each of the multiple users,
   wherein in the framework of the generation of the group-content-correlation a communication channel, over which the group members can be reached, is set,
   wherein the availability (Presence), the location and membership in a group are considered in the context of a user, and
   wherein the distribution logic includes the user selecting a distribution mode from plural available distribution modes, the selected distribution mode determining:
   i) a sub-set of the pre-arranged members of the social members to which the personalized group-related contents will be pushed by the push agent and
   ii) for the members receiving the personalized group-related contents pushed by the push agent, further distribution rights of the personalized group-related contents.

41. The method according to claim 40, wherein the groups are one of closed user groups and open user groups.

42. The method according to claim 40, wherein a pull agent gathering information from different content channels is used to select contents by the user side.

43. The method according to claim 42, wherein the content channels with which the pull agent communicates are at least one of RSS agents and mail agents.

44. The method according to claim 42, wherein the content channels are each assigned a channel profile, comprehensive information regarding the channel ID, the pull period, the title, the location, and the expiration time.

45. The method according to claim 43, wherein the content channels are each assigned a channel profile, comprehensive information regarding the channel ID, the pull period, the title, the location, and the expiration time.

46. The method according to claim 42, wherein the contents provided by the content channels are represented by individual content items.

47. The method according to claim 44, wherein the contents provided by the content channels are represented by individual content items.

48. The method according to claim 46, wherein the content items contain an unambiguous ID, a channel Id, a title, the content, a time stamp, and an expiration time.

49. The method according to claim 47, wherein the content items contain an unambiguous ID, a channel Id, a title, the content, a time stamp, and an expiration time.

50. The method according to claim 46, wherein a distribution logic analyzes the content items of the selected contents.

51. The method according to claim 47, wherein a distribution logic analyzes the content items of the selected contents.

52. The method according to claim 40 wherein the selected contents are pushed by using at least one of SMS, e-mail, IM, SIP, TCP, and HTTP.

53. The method according to claim 40, wherein access rights of the group members to the pushed contents are controlled by a DRM (Digital Rights Management) system.

54. The method according to claim 40, wherein the distribution of the pushed contents is restricted to the group members.

55. The method according to claim 40, wherein the distribution of the pushed contents is restricted in such a way that the group members can forward the contents to one further user or to one further group respectively.

56. The method according to claim 40, wherein the distribution of the pushed contents is unrestricted.

57. A non-transitory computer readable medium having recorded thereon computer executable instructions, when executed on a computer, causing the computer to operate as a system for distributing contents to several users, wherein users are interconnected as members of one or more social groups and wherein the social group members are pre-arranged from the user side, said system comprising:
a pull agent for selecting based on a user's context one or more content items from offered contents;
a distribution logic for dynamically personalizing the selected contents by taking advantage of a correlation of selected contents on the one hand and a group on the other hand by embedding communication triggers into the contents to initiate a communication with a group; and
a push agent for pushing the personalized group-related contents to the members of the group,
wherein the system executes the steps of:
a) based on a user's context and using a pull agent in one of i) a user-side device and ii) a network-side component, obtaining contents items from contents offered from different content channels, the different content channels including RSS agents, by executing a channel management operation comprising the sub-steps of:
using the pull agent to gather information regarding channel profiles from the different content channels, the different content channels serving as different sources of information, the channel profiles containing information of the content of the respective content channels, and based on the gathered information regarding the profiles provided to the pull agent, using the pull agent to perform a pull process from each of the different content channels to obtain the contents items;
b) based on the pull process from each of the different content channels, executing a distribution logic to create personalized group-related contents to members of a social group, by the sub-steps of:
a selecting sub-steps of i) analyzing information stored in the obtained contents items and ii) creating a correlation of content and group profiles, the group profiles stored in a database and contain information regarding a group ID, a social group profile with social group properties, and the push period,
based on the created correlation, gathering selected contents items from the obtained contents items,
embedding communication IQ triggers into the gather contents items to initiate a communication with the members of the group to define a delivery configuration; and
c) based on the delivery configuration, using a push agent to push the personalized group-related contents to the pre-arranged members of the social group with the content being distributed to multiple users and personalized for each of the multiple users,
wherein the distribution logic includes the user selecting a distribution mode from plural available distribution modes, the selected distribution mode determining
i) which members of the pre-arranged members of the social members to which the personalized group-related contents will be pushed by the push agent, and
ii) for the members receiving the personalized group-related contents pushed by the push agent, further distribution rights of the personalized group-related contents.

58. A method for distributing contents to several users, comprising:
channel management steps of
i) a user, from a user side, pre-arranging users as members of the respective social groups,
ii) using a pull agent to gather information content items from different content channels, the content channels being one of RSS agents and mail agents, and
iii) creating a group-content correlation to social groups by entering the gathered information content items into a distribution logic and connecting the gathered information content items to profiles of the social groups and profiles of members of the social groups; and
a content delivery step using
i) a push agent to distribute selected contents items from the gathered information content items to the social groups,
wherein the user selects a distribution mode from the group comprising:
1) a first distribution mode in which the distribution of information content items is restricted to the pre-arranged members of one of the social groups, with distribution of information content items limited to boundaries of the group-content correlation with rights for further distribution to users outside the one social group being withheld,
2) a second distribution mode in which the distribution of information content items is restricted to a first set of the pre-arranged members of one of the social groups, with initial distribution of information content items limited to boundaries of the group-content correlation associated with the first set of the pre-arranged members, with rights for further distribution to further pre-arranged members of the one social group being extended to the first set of the pre-arranged members of the one social group, 3) a third distribution mode in which the distribution of information content items is restricted to a first set of the pre-arranged members of one of the social groups, with initial distribution of information content items limited to boundaries of the group-content correlation associated with the first set of the pre-arranged members, with rights for further distribution to further pre-arranged members of the one social group being extended to the first set of the pre-arranged members of the one social group, and with rights for further distribution to users outside the one social group being extended to only the pre-arranged members of the one social group and being withheld from non-members of the one social group, and 4) a fourth distribution mode in which the distribution of information content items is restricted to the pre-arranged members of one of the social groups, with initial distribution of information contents limited to boundaries of the group-content correlation associated with the pre-arranged members, with rights for further distribution to users outside the one social group being extended to only the pre-arranged members of the one social group, wherein the channel management steps further comprise a) based on the user's context and using the pull agent in one of i) a user-side device and ii) a network-side component, obtaining contents items from information contents offered from different content channels, by executing sub-steps of:

using the pull agent to gather information regarding channel profiles from different content channels, the different content channels serving as different sources of information and the channel profiles contain information the content of the respective content channels, and based on the gathered information regarding the profiles provided to the pull agent, using the pull agent to perform a pull process from each of the different content channels to obtain the contents items;

b) based on the pull process from each of the different content channels, executing the distribution logic to create personalized group-related contents to the pre-arranged members of the social groups, by the sub-steps of:

selecting sub-steps of i) analyzing information stored in the obtained contents items and ii) creating a correlation of content and group profiles, the group profiles stored in a database and contain information regarding a group ID, a social group profile with social group properties, and a push period, based on the created correlation, gathering the selected contents items from the obtained contents items, and based on the user-selected distribution mode, embedding communication IQ triggers into the gather contents items to initiate a communication with the pre-arranged members of the group to define a delivery configuration; and c) based on the defined delivery configuration, using the push agent to push the personalized group-related contents to the pre-arranged members of the one social group with the content being distributed to the pre-arranged members and personalized for each of the pre-arranged members.

* * * * *